US012099292B2

(12) United States Patent
Li et al.

(10) Patent No.: US 12,099,292 B2
(45) Date of Patent: Sep. 24, 2024

(54) MULTI-VIEW VISION INSPECTION SYSTEM

(71) Applicant: SpeedBot Robotics Co., Ltd., Changsha (CN)

(72) Inventors: Huang Li, Changsha (CN); Jun Li, Changsha (CN)

(73) Assignee: SpeedBot Robotics Co., Ltd., Changsha (CN)

(*) Notice: Subject to any disclaimer, the term of this patent is extended or adjusted under 35 U.S.C. 154(b) by 147 days.

(21) Appl. No.: 17/857,193

(22) Filed: Jul. 5, 2022

(65) Prior Publication Data

US 2023/0004078 A1 Jan. 5, 2023

(30) Foreign Application Priority Data

Jul. 5, 2021 (CN) .......................... 202121518093.9

(51) Int. Cl.
*G03D 17/00* (2006.01)
*G06T 7/00* (2017.01)

(52) U.S. Cl.
CPC ........... *G03D 17/00* (2013.01); *G06T 7/0004* (2013.01)

(58) Field of Classification Search
CPC ................................ G03B 15/06; G03B 15/07
See application file for complete search history.

(56) References Cited

U.S. PATENT DOCUMENTS

| 10,324,223 | B2* | 6/2019 | Al-Hoshani | G01N 35/02 |
| 2011/0069944 | A1* | 3/2011 | Johnson | G03B 15/00 396/2 |
| 2016/0100087 | A1* | 4/2016 | Scheich | G06T 1/0007 348/47 |
| 2018/0160019 | A1* | 6/2018 | Scheich | G06T 1/0007 |
| 2022/0299845 | A1* | 9/2022 | Scheich | G06T 15/503 |

* cited by examiner

Primary Examiner — Noam Reisner

(57) ABSTRACT

A multi-view vision inspection system includes a darkroom; and a plurality of cameras, the plurality of cameras including a plurality of first cameras, a plurality of second cameras and a plurality of third cameras, the plurality of first cameras being arranged spaced from one another at a top of an interior of the darkroom, the plurality of second cameras being arranged spaced from one another at a bottom of the interior of the darkroom, and the plurality of third cameras being arranged spaced from one another on a side wall of the interior of the darkroom in a circumferential direction of the darkroom. The multi-view vision inspection system can measure each angle of a workpiece to be inspected by using the plurality of cameras above.

16 Claims, 5 Drawing Sheets

MULTI-VIEW VISION INSPECTION SYSTEM

CROSS REFERENCE TO THE RELATED APPLICATIONS

This application is based upon and claims priority to Chinese Patent Application No. 202121518093.9, filed on Jul. 5, 2021, the entire contents of which are incorporated herein by reference.

TECHNICAL FIELD

The present disclosure relates to the technical field of machine vision, and in particular to a multi-view vision inspection system.

BACKGROUND

In the four stages of industrial development, we are currently in the informatization era of industry 3.0. In May 2015, the State Council formally printed "Chinese Manufacturing 2025" and deployed a strategy to fully advance and implement manufacturing strong countries. Along with development of industrial and social requirements, the requirement of industrial manufacturing production for precision is increasingly high, the precision of produced workpieces needs to be guaranteed in addition to completing rapid and efficient production in industrial manufacturing, and in order to meet the requirement, the processing process needs to be improved, and an accurate measuring tool is further needed to determine the qualification of the processing process and position the problems existing in processing, thereby the optimizing and improving the manufacturing process. High-precision measurement of large-size workpieces is always a difficult problem in the fields of industrial manufacturing such as spaceflight, automobiles, ships, etc., high-precision rapid measurement of the large workpieces is beneficial to promoting the development of industrial manufacturing and fully guaranteeing the precision of production manufacturing and the safety of workpiece application.

Presently, industrial high-precision detection modes can be divided into two types according to methods: a contact type and a non-contact type. The contact type is a three-coordinate measuring machine, and the non-contact type is scanning and vision inspection. The three-coordinate inspection apparatus has simple, accurate and reliable measurement, excellent flexibility, but has high price, inspects one workpiece for several hours and accordingly, is not applicable to on-line inspection and is only applicable to casual inspection, and can control the size production quality of all shipped members in an all-around mode.

In the related art, some measurement systems have the advantages of non-contact measurement, high three-dimensional measurement precision, high automation degree, strong robustness, low environmental requirements, etc. However, with long inspection time and high price, the application of the measurement systems to aviation manufacturing, transportation, production of major products, etc. is limited.

SUMMARY

An internationally leading and domestic unique autonomous intellectual property multi-view vision high-precision measurement technology is researched and developed. An advanced multi-view three dimensional (3D) vision technology is used for performing one-time photographing and combined measurement and computation on a workpiece to be inspected by a plurality of cameras, such that precision is high, a speed is high, and coverage is large. The technology solves the problems of small coverage, limited splicing precision, etc. of existing measurement technologies of laser 3D scanning, structured light 3D imaging, etc., and is very suitable for accurately and efficiently measuring large-size workpieces.

The present disclosure aims to solve at least one of the technical problems existing in the prior art. Therefore, one objective of the present disclosure is to provide a multi-view vision inspection system, which may measure each angle of a workpiece to be inspected.

A multi-view vision inspection system according to an embodiment of the present disclosure includes a darkroom; and a plurality of cameras, the plurality of cameras including a plurality of first cameras, a plurality of second cameras and a plurality of third cameras, the plurality of first cameras being arranged spaced from one another at a top of an interior of the darkroom, the plurality of second cameras being arranged spaced from one another at a bottom of the interior of the darkroom, and the plurality of third cameras being arranged spaced from one another on a side wall of the interior of the darkroom in a circumferential direction of the darkroom.

The multi-view vision inspection system according to the embodiment of the present disclosure may measure each angle of a workpiece to be inspected by using the plurality of cameras above.

According to some embodiments of the present disclosure, an inner frame is arranged in the darkroom, and the plurality of first cameras, the plurality of second cameras and the plurality of third cameras are all arranged on the inner frame; and the multi-view vision inspection system further includes a conveying mechanism, where one end of the conveying mechanism is located outside the darkroom, the other end of the conveying mechanism extends into the darkroom, and the conveying mechanism is spaced from the inner frame.

According to some embodiments of the present disclosure, the inner frame is of a frame structure made of square steel, and the plurality of first cameras, the plurality of second cameras and the plurality of third cameras are each rotatably arranged on the inner frame.

According to some embodiments of the present disclosure, the multi-view vision inspection system further includes a projection spotlight, where the projection spotlight is arranged on the inner frame.

According to some embodiments of the present disclosure, the inner frame is of a frame structure, a plurality of shockproof foot cups are arranged at a bottom of the inner frame, and the inner frame is not connected to the darkroom.

According to some embodiments of the present disclosure, each of the first cameras, each of the second cameras and each of the third cameras are each a two dimensional (2D) camera.

According to some embodiments of the present disclosure, both a top wall and a bottom wall of the darkroom are diffusively reflective surfaces; and a plurality of light sources are arranged in the darkroom, and include a plurality of first light sources and a plurality of second light sources, where the plurality of first light sources are all arranged on an upper portion of the interior of the darkroom and face the top wall of the darkroom, the plurality of first light sources are arranged spaced from one another in the circumferential direction of the darkroom, the plurality of second light sources are all arranged on a lower portion of the interior of the darkroom and face the bottom wall of the darkroom, and the plurality of second light sources are arranged spaced from one another in the circumferential direction of the darkroom.

According to some embodiments of the present disclosure, frosted stickers are attached to the top wall and the bottom wall of the darkroom respectively.

According to some embodiments of the present disclosure, the plurality of light sources are each independently controlled.

According to some embodiments of the present disclosure, the darkroom includes an outer frame, the outer frame including an aluminum profile; and a plurality of flat plates, the plurality of flat plates being detachably arranged on the outer frame, and including aluminum plastic plates.

Additional aspects and advantages of the present disclosure will be set forth partially in the following description, which will become obvious in the following description, or may be learned by practice of the present disclosure.

BRIEF DESCRIPTION OF THE DRAWINGS

What is described above and/or additional aspects and advantages of the present disclosure will become apparent and easy to understand from the following description of the embodiments in combination with the drawings below, in which.

Figure 1:
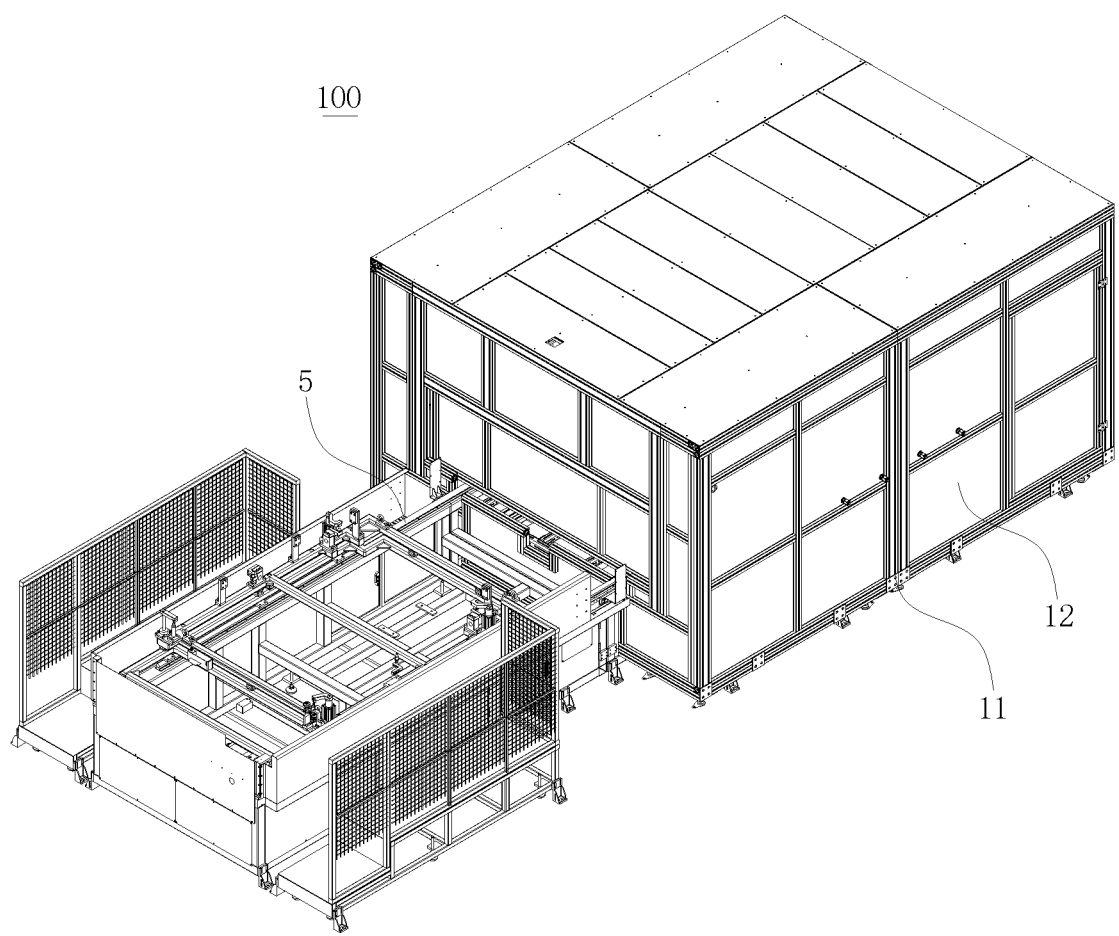
FIG. 1 is a perspective diagram of a multi-view vision inspection system according to an embodiment of the present disclosure.

REFERENCE NUMERALS multi-view vision inspection system 100;
darkroom 1; outer frame 11; flat plate 12;
inner frame 2; shockproof foot cup 21;
first light source 31; second light source 32;
a plurality of first cameras 34, a plurality of second cameras 36, a plurality of third cameras 38, and projection spotlights 40;
mounting support 4; and conveying mechanism 5.

Detailed Description of the Embodiments

Embodiments of the present disclosure are described in detail below, and the embodiments described with reference to the drawings are exemplary. The embodiments of the present disclosure are described in detail below.

A multi-view vision inspection system 100 according to an embodiment of the present disclosure is described below with reference to FIGS. 1-8.

As shown in FIGS. 1-8, the multi-view vision inspection system 100 according to the embodiment of the present disclosure includes a darkroom 1 and a plurality of cameras.

Specifically, arrangement of the darkroom 1 may effectively solve interference of external ambient light on visual imaging of a workpiece to be inspected. The plurality of cameras include a plurality of first cameras 34, a plurality of second cameras 36, and a plurality of third cameras 38, where the plurality of first cameras 34 are arranged spaced from one another at a top of an interior of the darkroom 1, the plurality of second cameras 36 are arranged spaced from one another at a bottom of the interior of the darkroom 1, and the plurality of third cameras 38 are arranged spaced from one another on a side wall of the interior of the darkroom 1 in a circumferential direction of the darkroom 1. The plurality of cameras may perform combined calibration measurement, and are arranged in a 360-degree surrounding manner, thereby measuring each angle of the workpiece to be inspected at the same time.

Therefore, a multi-camera combined calibration technology is used, such that multi-angle full-coverage photographing, one-time photographing, combined measurement and computation, high precision, a rapid speed, and large coverage are achieved, thereby solving the problems of small coverage, limited splicing precision, slow beat, etc. of measurement technologies of laser three dimensional (3D) scanning, structured light 3D imaging, etc., and measuring all sizes (position degree, planeness, profile tolerance, linear size, etc.) of all workpieces on line.

Optionally, each of the first cameras 34, each of the second cameras 36 and each of the third cameras 38 are, but not limited to, each a two dimensional (2D) camera.

The multi-view vision inspection system 100 according to the embodiment of the present disclosure may measure each angle of the workpiece to be inspected by using the plurality of cameras above.

According to some embodiments of the present disclosure, an inner frame 2 is arranged in the darkroom 1, and the plurality of first cameras 34, the plurality of second cameras 36 and the plurality of third cameras 38 are all arranged on the inner frame 2. With reference to FIG. 1, the multi-view vision inspection system 100 further includes a conveying mechanism 5, where one end of the conveying mechanism 5 is located outside the darkroom 1, the other end of the conveying mechanism 5 extends into the darkroom 1, the conveying mechanism 5 is used for conveying the workpiece to be inspected into the darkroom 1, and the conveying mechanism 5 is spaced from the inner frame 2. Thus, inspection precision may be guaranteed by separating the plurality of cameras from the conveying mechanism 5.

Optionally, the inner frame 2 is of a frame structure made of square steel, and the plurality of first cameras 34, the plurality of second cameras 36 and the plurality of third cameras 38 are each rotatably arranged on the inner frame 2. For example, the plurality of cameras may be mounted on the inner frame 2, thereby conveniently and flexibly adjusting mounting positions of the cameras and reducing weight of the whole multi-view vision inspection system 100.

According to a further embodiment of the present disclosure, the multi-view vision inspection system 100 further includes: a plurality of projection spotlights 40, where the plurality of projection spotlights 40 are arranged on the inner frame 2. Of course, a laser may be further arranged on the inner frame 2.

According to some embodiments of the present disclosure, the inner frame 2 is of a frame structure, a plurality of shockproof foot cups 21 are arranged at a bottom of the inner frame 2, and the inner frame 2 is not connected to the darkroom 1. For example, the inner frame 2 may be of the frame structure built by square steel having kidney-shaped holes at four sides, a main body of the inner frame 2 is welded into a whole, a cross beam for conveniently mounting light sources, etc. may be arranged in a middle of the inner frame, inclined struts for improving rigidity of the inner frame 2 may be arranged at a periphery of the inner frame, and the shockproof foot cups 21 are arranged at a bottom of the inner frame. The inner frame 2 is not connected to the darkroom 1, thereby effectively isolating interference of the darkroom 1 to an internal structure, and facilitating flexible mounting of the light sources, etc.

According to some embodiments of the present disclosure, both a top wall and a bottom wall of the darkroom are diffusively reflective surfaces. A plurality of light sources are arranged in the darkroom, and includes a plurality of first light sources 31 and a plurality of second light sources 32, where the plurality of first light sources 31 are all arranged on an upper portion of the interior of the darkroom 1 and face the top wall of the darkroom 1, the plurality of first light sources 31 are arranged spaced from one another in the circumferential direction of the darkroom 1, the plurality of second light sources 32 are all arranged on a lower portion of the interior of the darkroom 1 and face the bottom wall of the darkroom 1, and the plurality of second light sources 32 are arranged spaced from one another in the circumferential direction of the darkroom 1. For example, the six first light sources 31 and the six second light sources 32 may be arranged at a periphery of the interior of the darkroom 1, the six first light sources 31 are arranged on the upper portion of the darkroom 1, and the six second light sources 32 are arranged on the lower portion of the interior of the darkroom 1, so as to illuminate a placement area of the workpiece to be inspected.

The first light sources 31 on the upper portion obliquely irradiate the top wall of the darkroom 1, the light sources 32 on the lower portion obliquely irradiate the bottom wall of the darkroom 1, and the top wall and the bottom wall of the darkroom 1 are diffusively reflective surfaces such that incident light with high directivity of the first light sources 31 and the second light sources 32 may be changed into uniform and soft reflected light pointing to the periphery, and therefore, the workpiece to be inspected is uniformly illuminated, and by means of such the manner, most of positions of the workpiece to be inspected may be effectively imaged. Therefore, the situation of non-uniform light reflection and illumination of the workpiece to be inspected may be effectively avoided, visual imaging quality of the workpiece to be inspected, is improved, and the multi-view vision inspection system is particularly suitable for large-size workpieces.

Optionally, frosted stickers are attached to the top wall and the bottom wall of the darkroom 1 respectively. For example, the top wall and the bottom wall of the darkroom 1 may be pasted with light color diffusively reflective stickers, for example, light gray diffusively reflective stickers, respectively, surfaces of the stickers may be frosted, and when the first light sources 31 and the second light sources 32 irradiate the frosted stickers, direct light is reflected through the rough surfaces of the frosted stickers to form diffuse reflection such that incident light having high directivity may be well changed into the reflected light pointing to the periphery, and therefore, the workpiece to be inspected, for example, a metal workpiece, may be uniformly illuminated.

By means of diffuse reflection irradiation of the frosted stickers, the requirement for uniform illumination of most areas of the workpiece to be inspected may be met, and for dark-color casting areas having a complex bottom structure of the workpiece to be inspected, the problem of uniform illumination of the areas may not be well solved only by using a diffuse reflection mode, such that edge features of holes may not be highlighted. In such a case, targeted illumination needs to be carried out according to structural features of a surface of the dark-color casting area, the surface of the dark-color casting area is rough and dark in color, a material of the dark-color casting area is different from that of other portions of the workpiece, and in addition, due to use of a casting technology, the surface has poor consistency, and small holes to be inspected are scattered in position and are usually located on a milling surface of a casting surface.

According to a further embodiment of the invention, the plurality of light sources further includes a plurality of auxiliary light sources, where the plurality of auxiliary light sources are movably arranged on the inner frame 2. For example, the two auxiliary light sources may be arranged on two sides of a casting surface of the workpiece to be inspected respectively for large-angle direct irradiation. For example, the plurality of auxiliary light sources may be rotatably mounted on the inner frame 2 by means of mounting supports 4, so as to adjust an illumination angle of the auxiliary light sources. Understandably, different types of mounting supports 4 may be customized according to shapes of different light sources, the mounting supports 4 may each have an angle adjustment range of 180 degrees, and may be flexibly mounted on the inner frame 2, so as to meet layout of the light sources at different positions.

Optionally, the plurality of auxiliary light sources are strip light sources.

In addition to the common small holes, a plurality of threaded holes may be further provided on the surface of the workpiece to be inspected, the threaded holes are different in size, and a plurality of thread surfaces are provided in each of the small holes and extend from top to bottom at a certain angle, resulting in severe light reflection. Therefore, the surface of the workpiece to be inspected may be photographed in a time-sharing manner, thereby improving contrast of edges of the threaded holes. In such a case, the plurality of light sources are each independently controlled.

Optionally, the plurality of first light sources 31 and the plurality of second light sources 32 are, but not limited to, all flat plate light sources.

Figure 2:
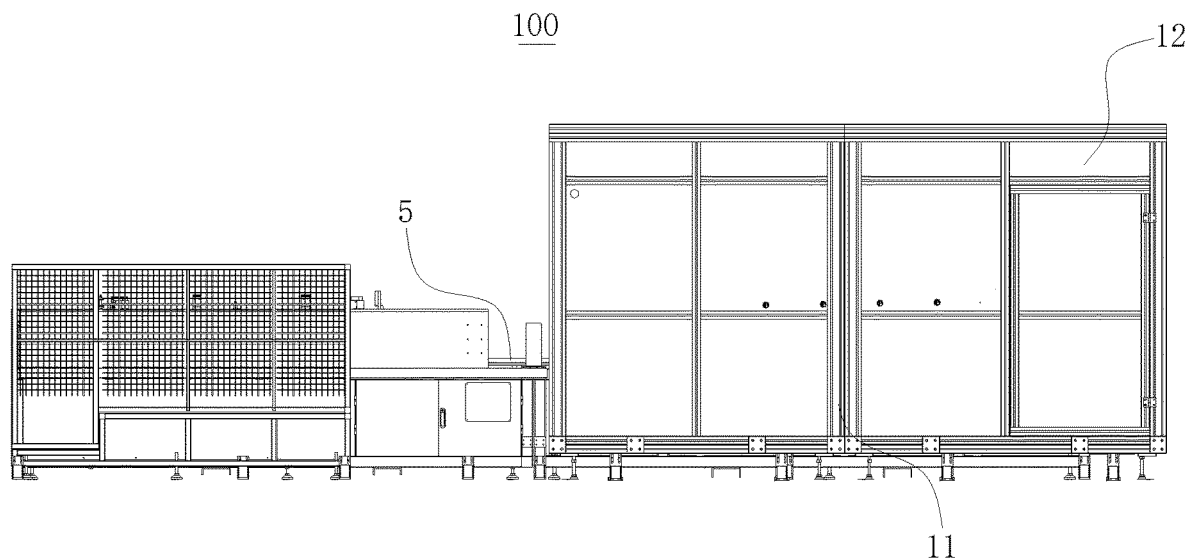
FIG. 2 is a front view of a multi-view vision inspection system shown in FIG. 1.
Figure 3:
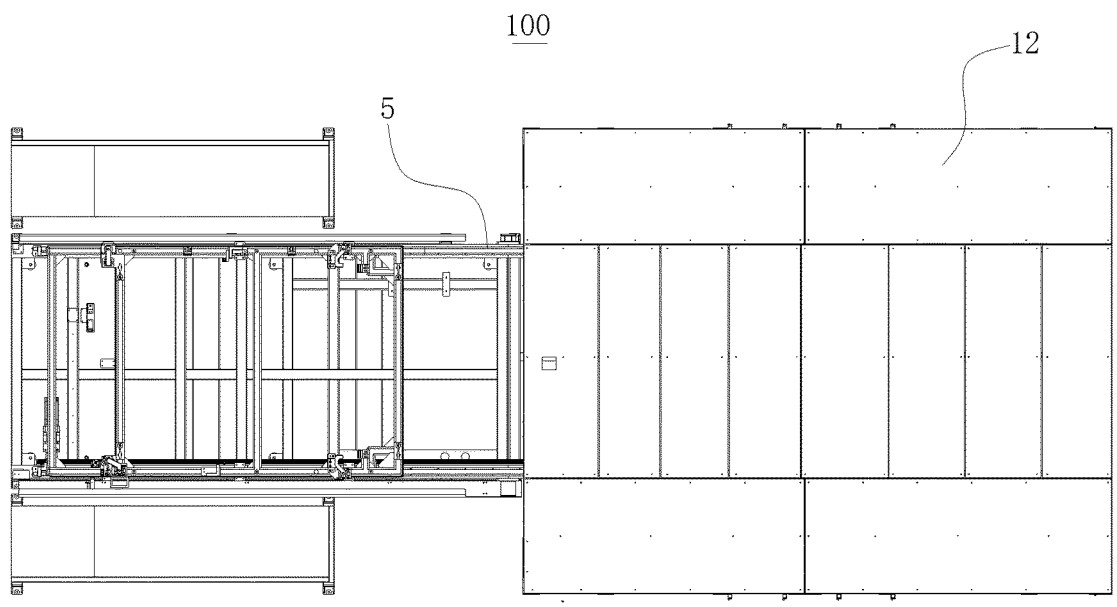
FIG. 3 is a top view of the multi-view vision inspection system shown in FIG. 1.
Figure 4:
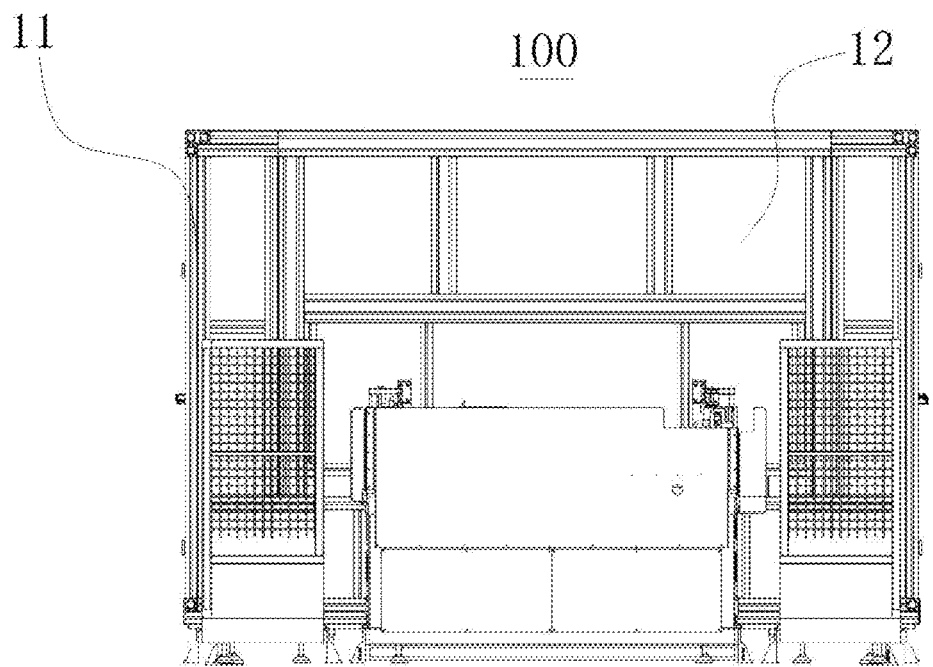
FIG. 4 is a side view of the multi-view vision inspection system shown in FIG. 1.
Figure 5:
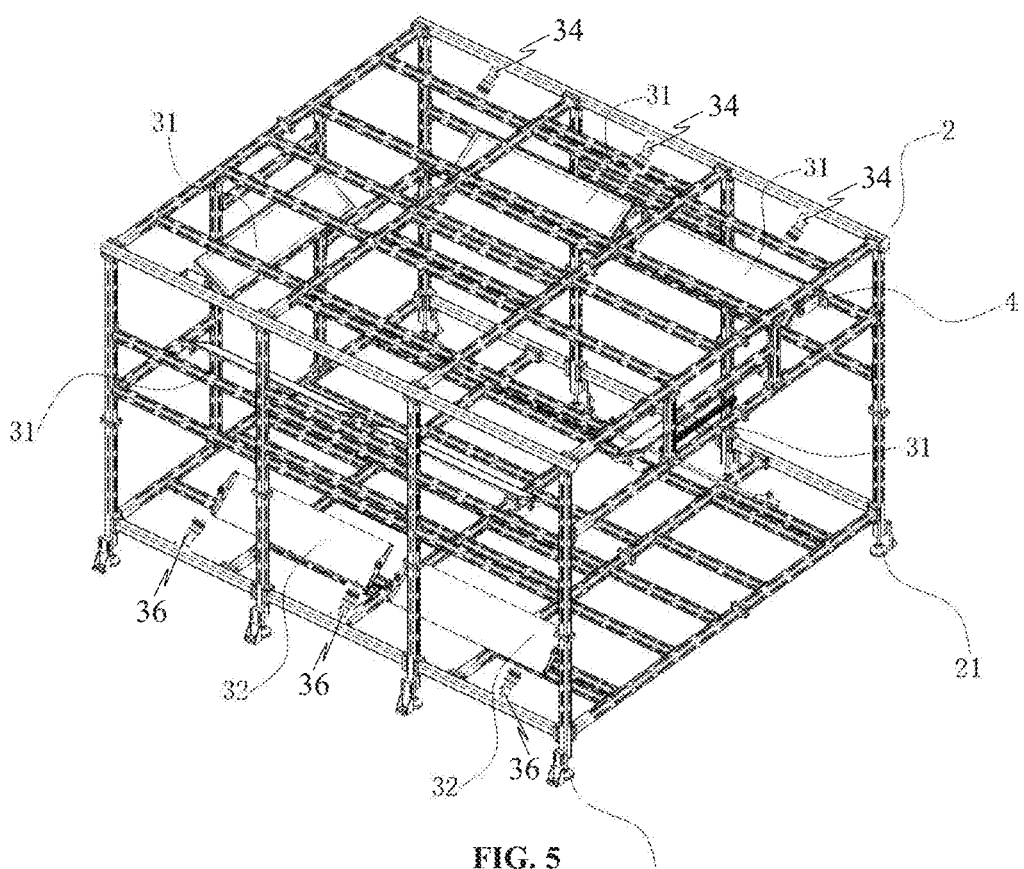
FIG. 5 is a schematic diagram of an internal structure of a darkroom shown in FIG. 1, where the darkroom is not shown.
Figure 6:
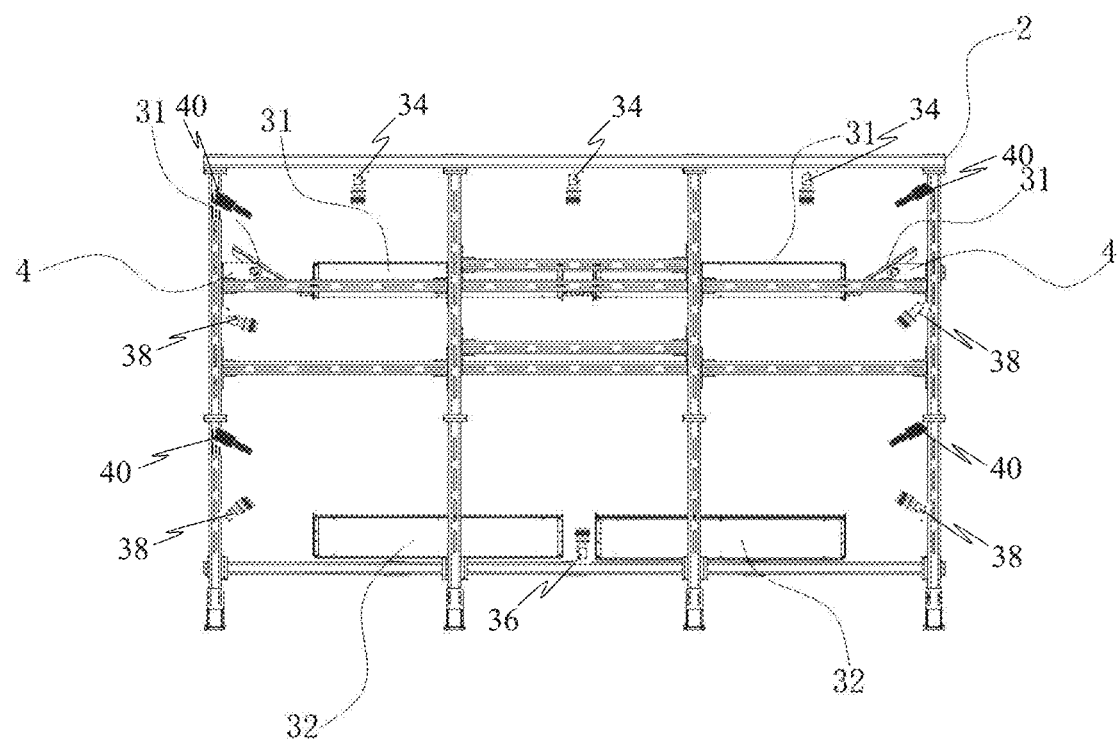
FIG. 6 is a front view of an internal structure of a darkroom shown in FIG. 5.
Figure 7:
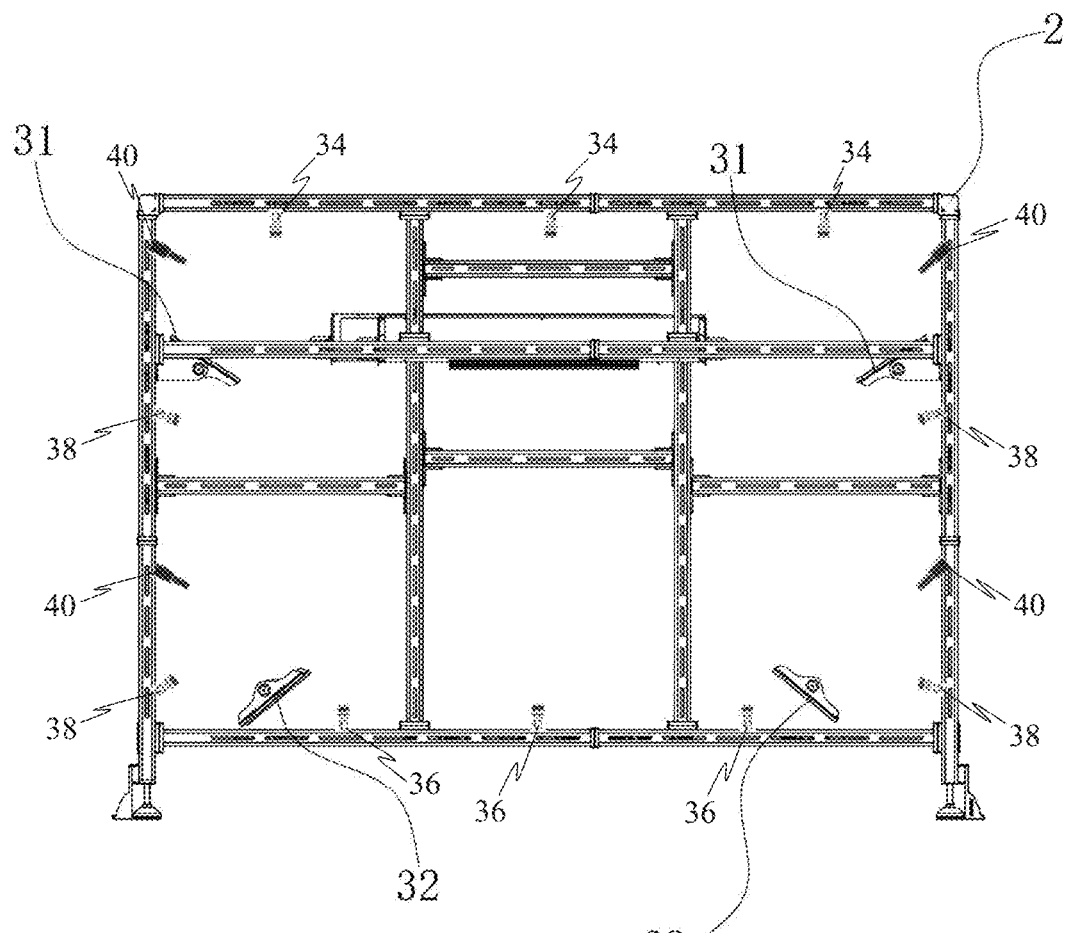
FIG. 7 is a side view of the internal structure of the darkroom shown in FIG. 5.
Figure 8:
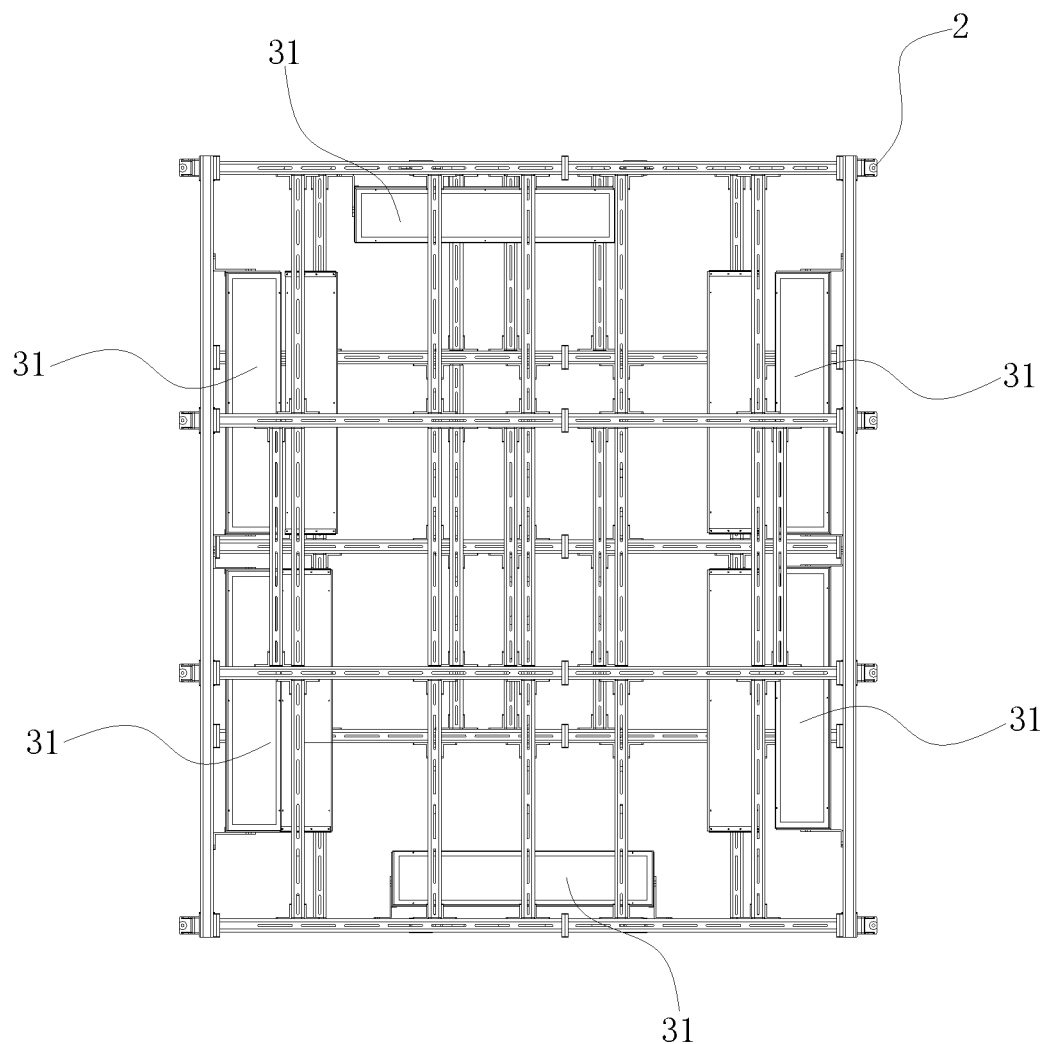
FIG. 8 is a top view of the internal structure of the darkroom shown in FIG. 5.

According to some particular embodiments of the present disclosure, with reference to FIG. 1 in combination with FIGS. 2-4, the darkroom 1 includes an outer frame 11 and a plurality of flat plates 12, where the plurality of flat plates 12 are detachably arranged on the outer frame 11, the outer frame 11 includes an aluminum profile, and the plurality of flat plates 12 include aluminum plastic plates. The darkroom 1 may be mainly constructed by the aluminum profile and the aluminum plastic plates, and is flexible to dismount and mount.

The specific operation process of the multi-view vision inspection system 100 according the embodiment of the present disclosure is as follows:

by means of manual feeding of a power-assisted arm (not shown in the figures), an operator may hoist the workpiece to be inspected to a jig (not shown in the figures), a detection button is started, and then the workpiece to be inspected may be driven by a servo motor of the conveying mechanism 5 and conveyed into the darkroom 1. After the workpiece to be inspected reaches a terminal point, the workpiece to be inspected starts to be photographed to acquire data. After photographing is completed, the workpiece to be inspected is driven by the servo motor to return to a starting point, then the workpiece to be inspected is moved away by an original tool, and meanwhile, an industrial personal computer synchronously starts image processing and size computation, and after computation is completed, a measurement report of the workpiece to be inspected is automatically generated.

The multi-view vision inspection system 100 according to the embodiment of the present disclosure has the following advantages:

1, cost is low and is half of apparatuses of a laser radar, etc.;
2, precision is high and is twice that of the apparatuses of the laser radar, etc.;
3, the speed is rapid and is dozens of times that of apparatuses of a three-coordinate apparatus, the laser radar, etc.; and
4, the coverage is large, and scene customization may be carried out according to user requirements.

In the description of the present disclosure, it is to be understood that the terms "central", "longitudinal", "transverse", "upper", "lower", "front", "back", "left", "right", "vertical", "horizontal", "top", "bottom", "inner", "outer", etc. indicate azimuthal or positional relations on the basis of those shown in the drawings only for ease of description of the present disclosure and for simplicity of description, and are not intended to indicate or imply that the referenced device or element must have a particular orientation and be constructed and operative in a particular orientation, and thus may not be construed as a limitation on the present disclosure.

In the description of the present disclosure, "first feature" and "second feature" may include one or more of the features.

In the description of the present disclosure, a first feature being "above" or "below" a second feature may include the first and second features being in direct contact or that the first and second features being not in direct contact but being in contact by means of additional features between the first and second features.

In the description of the present disclosure, a first feature being "over", "above" and "on" a second feature includes the first feature being directly above and obliquely above the second feature, or simply indicates that the first feature is at a higher level than the second feature.

In the description of the description, the description with reference to terms of "an embodiment", "some embodiments", "exemplary embodiments", "particular examples", or "some examples" means that specific features, structures, materials, or characteristics described in combination with the embodiment(s) or example(s) are included in at least one embodiment or example of the present disclosure. In the description, the schematic descriptions of the above terms do not necessarily refer to the same embodiment or example.

Although the embodiments of the present disclosure have been illustrated and described, it should be understood that those of ordinary skill in the art may make various changes, modifications, replacements and variations to these embodiments without departing from the principle and objective of the present disclosure, the scope of the present disclosure is limited by the claims and their legal equivalents.

What is claimed is:

1. A multi-view vision inspection system, comprising:
   a darkroom;
   a plurality of cameras, wherein the plurality of cameras comprise a plurality of first cameras, a plurality of second cameras and a plurality of third cameras, wherein:
      the plurality of first cameras are arranged spaced from one another at a top of an interior of the darkroom;
      the plurality of second cameras are arranged spaced from one another at a bottom of the interior of the darkroom; and
      the plurality of third cameras are arranged spaced from one another on a side wall of the interior of the darkroom in a circumferential direction of the darkroom;
   an inner frame is of a frame structure; and
   a plurality of shockproof foot cups are arranged at a bottom of the inner frame, and the inner frame is not connected to the darkroom.

2. The multi-view vision inspection system according to claim 1, wherein
   the inner frame is arranged in the darkroom;
   the plurality of first cameras, the plurality of second cameras and the plurality of third cameras are all arranged on the inner frame; and
   a conveying mechanism, wherein a first end of the conveying mechanism is located outside the darkroom, a second end of the conveying mechanism extends into the darkroom, and the conveying mechanism is spaced from the inner frame.

3. The multi-view vision inspection system according to claim 2, wherein:
   the inner frame is of the frame structure made of a square steel; and
   the plurality of first cameras, the plurality of second cameras and the plurality of third cameras are each rotatably arranged on the inner frame.

4. The multi-view vision inspection system according to claim 3, wherein
   a top wall of the darkroom and a bottom wall of the darkroom are diffusively reflective surfaces; and
   a plurality of light sources are arranged in the darkroom, wherein, the plurality of light sources comprise a plurality of first light sources and a plurality of second light sources, wherein:
      the plurality of first light sources are arranged on an upper portion of the interior of the darkroom and face the top wall of the darkroom;
      the plurality of first light sources are arranged spaced from one another in the circumferential direction of the darkroom;
      the plurality of second light sources are arranged on a lower portion of the interior of the darkroom and face the bottom wall of the darkroom; and
      the plurality of second light sources are arranged spaced from one another in the circumferential direction of the darkroom.

5. The multi-view vision inspection system according to claim 3, wherein the darkroom comprises:
   an outer frame, wherein the outer frame comprises an aluminum profile; and
   a plurality of flat plates, wherein the plurality of flat plates are detachably arranged on the outer frame, and comprise aluminum composite material plates.

6. The multi-view vision inspection system according to claim 2, further comprising:
   a plurality of projection spotlights, wherein the plurality of projection spotlights are arranged on the inner frame.

7. The multi-view vision inspection system according to claim 6, wherein
   a top wall of the darkroom and a bottom wall of the darkroom are diffusively reflective surfaces; and
   a plurality of light sources are arranged in the darkroom, wherein, the plurality of light sources comprise a plurality of first light sources and a plurality of second light sources, wherein:
      the plurality of first light sources are arranged on an upper portion of the interior of the darkroom and face the top wall of the darkroom;
      the plurality of first light sources are arranged spaced from one another in the circumferential direction of the darkroom;
      the plurality of second light sources are arranged on a lower portion of the interior of the darkroom and face the bottom wall of the darkroom; and
      the plurality of second light sources are arranged spaced from one another in the circumferential direction of the darkroom.

8. The multi-view vision inspection system according to claim 6, wherein the darkroom comprises:
   an outer frame, wherein the outer frame comprises an aluminum profile; and
   a plurality of flat plates, wherein the plurality of flat plates are detachably arranged on the outer frame, and comprise aluminum composite material plates.

9. The multi-view vision inspection system according to claim 2, wherein
   a top wall of the darkroom and a bottom wall of the darkroom are diffusively reflective surfaces; and
   a plurality of light sources are arranged in the darkroom, wherein, the plurality of light sources comprise a plurality of first light sources and a plurality of second light sources, wherein:
      the plurality of first light sources are arranged on an upper portion of the interior of the darkroom and face the top wall of the darkroom;
      the plurality of first light sources are arranged spaced from one another in the circumferential direction of the darkroom;
      the plurality of second light sources are arranged on a lower portion of the interior of the darkroom and face the bottom wall of the darkroom; and
      the plurality of second light sources are arranged spaced from one another in the circumferential direction of the darkroom.

10. The multi-view vision inspection system according to claim 2, wherein the darkroom comprises:
    an outer frame, wherein the outer frame comprises an aluminum profile; and
    a plurality of flat plates, wherein the plurality of flat plates are detachably arranged on the outer frame, and comprise aluminum composite material plates.

11. The multi-view vision inspection system according to claim 1, wherein the plurality of first cameras, the plurality of second cameras and the plurality of third cameras are each a two dimensional (2D) camera.

12. The multi-view vision inspection system according to claim 11, wherein
    a top wall of the darkroom and a bottom wall of the darkroom are diffusively reflective surfaces; and
    a plurality of light sources are arranged in the darkroom, wherein, the plurality of light sources comprise a plurality of first light sources and a plurality of second light sources, wherein:
       the plurality of first light sources are arranged on an upper portion of the interior of the darkroom and face the top wall of the darkroom;
       the plurality of first light sources are arranged spaced from one another in the circumferential direction of the darkroom;
       the plurality of second light sources are arranged on a lower portion of the interior of the darkroom and face the bottom wall of the darkroom; and
       the plurality of second light sources are arranged spaced from one another in the circumferential direction of the darkroom.

13. The multi-view vision inspection system according to claim 11, wherein the darkroom comprises:
    an outer frame, wherein the outer frame comprises an aluminum profile; and
    a plurality of flat plates, wherein the plurality of flat plates are detachably arranged on the outer frame, and comprise aluminum composite material plates.

14. The multi-view vision inspection system according to claim 1,
    wherein a top wall of the darkroom and a bottom wall of the darkroom are diffusively reflective surfaces; and
    a plurality of light sources are arranged in the darkroom, wherein:
       the plurality of light sources comprise a plurality of first light sources and a plurality of second light sources;
       the plurality of first light sources are arranged on an upper portion of the interior of the darkroom and face the top wall of the darkroom;
       the plurality of first light sources are arranged spaced from one another in the circumferential direction of the darkroom;
       the plurality of second light sources are arranged on a lower portion of the interior of the darkroom and face the bottom wall of the darkroom; and
       the plurality of second light sources are arranged spaced from one another in the circumferential direction of the darkroom.

15. The multi-view vision inspection system according to claim 14, wherein the plurality of light sources are each independently controlled.

16. The multi-view vision inspection system according to claim 1, wherein the darkroom comprises:
    an outer frame, wherein the outer frame comprises an aluminum profile; and
    a plurality of flat plates, wherein the plurality of flat plates are detachably arranged on the outer frame, and comprise aluminum composite material plates.

\* \* \* \* \*